United States Patent [19]

D'Ambrose et al.

[11] Patent Number: 5,280,588
[45] Date of Patent: Jan. 18, 1994

[54] MULTIPLE INPUT/OUTPUT DEVICES HAVING SHARED ADDRESS SPACE

[75] Inventors: John J. D'Ambrose, Houston; William K. Shetterly, Friendswood, both of Tex.; Stephen Thompson, Delray Beach; Michael R. Turner, Boca Raton, both of Fla.

[73] Assignee: International Business Machines Corporation, Armonk, N.Y.

[21] Appl. No.: 931,650

[22] Filed: Aug. 18, 1992

Related U.S. Application Data

[63] Continuation of Ser. No. 606,012, Oct. 30, 1990, abandoned.

[51] Int. Cl.$^5$ ............................................. G06F 13/24
[52] U.S. Cl. .................................................... 395/275
[58] Field of Search ....................................... 395/250

[56] References Cited

U.S. PATENT DOCUMENTS

| 3,905,025 | 9/1975 | Davis et al. | 364/200 |
|---|---|---|---|
| 4,228,504 | 10/1980 | Lewis et al. | 364/200 |
| 4,291,371 | 9/1981 | Holtey | 364/200 |
| 4,320,456 | 3/1982 | Heise et al. | 364/200 |
| 4,644,462 | 2/1987 | Matsubara et al. | 364/200 |
| 4,649,479 | 3/1987 | Advani et al. | 364/300 |
| 4,750,113 | 6/1988 | Buggert | 364/200 |
| 4,764,864 | 8/1988 | Takane | 364/200 |
| 4,768,149 | 8/1988 | Komopik et al. | 364/200 |
| 4,779,187 | 10/1988 | Letwin | 364/200 |
| 4,812,967 | 3/1989 | Hirosawa et al. | 364/200 |
| 4,825,358 | 4/1989 | Letwin | 364/200 |
| 4,835,685 | 5/1989 | Kun | 364/200 |
| 4,885,681 | 12/1989 | Umeno et al. | 364/200 |
| 5,095,427 | 3/1992 | Tanaka et al. | 395/700 |
| 5,185,864 | 2/1993 | Bonevento et al. | 395/275 |

OTHER PUBLICATIONS

J. K. Boggs, Jr. "Virtual Input/Output Channels for a Digital Computer," IMB TDB, V. 20, No. 1, Jun. 1977 pp. 110–112.

F. M. Bonevento, et al., "Interrupt Service Allocation Technique For Microchannel Bus", IBM TDB, Vo. 33, No. 19 Jun. 1990, pp. 298–304.

Primary Examiner—Dale M. Shaw
Assistant Examiner—C. Shin
Attorney, Agent, or Firm—Lauren C. Bruzzone; Jesse L. Abzug

[57] ABSTRACT

A hardware-based system for managing multiple input/output devices sharing the same set of addresses in a computer system is described. The new VIRTUAL ENABLED state is a hybrid of the current ENABLED or ACTIVE and DISABLED or INACTIVE states. In the ENABLED state, an input/output (I/O) adapter responds to I/O addressing and presents interrupts to the processor. In the DISABLED state, the I/O adapter does not respond to I/O addressing and does not present interrupts. In the new VIRTUAL ENABLED state, the adapter does not respond to I/O addressing (as in the DISABLED state), but will still produce an interrupt (as in the ENABLED state). With the VIRTUAL state, multiple I/O adapters that would normally content for the same set of addresses (ENABLED state), or optionally be rendered inoperable (DISABLED state), can always remain available for I/O. A single register where the processor can read the interrupt status for all ENABLED and/or VIRTUAL ENABLED adapters sharing the same set of addresses is provided. Other unique registers are also provided to allow the processor to cycle any of the ENABLED and VIRTUAL ENABLED devices between these two states to permit servicing of the interrupt.

6 Claims, 4 Drawing Sheets

|  | READ | WRITE |  |
|---|---|---|---|
| 03F8 | RCV DATA | XMIT DATA | |
| 03F9 | STATUS #1 | STATUS #1 | |
| 03FA | STATUS #2 | STATUS #2 | 203 |
| 03FB | CONTROL #2 | CONTROL #2 | |
| 03FC | CONTROL #3 | CONTROL #3 | |
| 03FD | STATUS #3 | STATUS #3 | |
| 03FE | STATUS #4 | STATUS #4 | |
| 03FF | SCRATCH PAD | SCRATCH PAD | |

COM 1 brackets 03F8–03FF. Memory range 0 to FFFF.

FIG. 4 — 400: bits 8..1 = 1 1 1 1 1 1 0 1

FIG. 5 — 500: bits 8..1 = 0 0 0 0 0 0 1 0

MULTIPLE INPUT/OUTPUT DEVICES HAVING SHARED ADDRESS SPACE

DESCRIPTION

This application is a continuation of U.S. patent application Ser. No. 07/606012 filed on Oct. 30, 1990, now abandoned.

BACKGROUND OF THE INVENTION

1. Field of the Invention

This invention relates to input/output addressing in computer systems. In particular, a new hardware-based technique for providing virtual addressing in a personal computer system is described.

2. Background Art

In a personal computer system, such as IBM's Personal System/2 with MICRO CHANNEL architecture (IBM, Personal System/2, and MICRO CHANNEL are registered trademarks of International Business Machines Corporation), input/output (I/O) devices such as displays, keyboards, mice, etc. communicate with the system processor via individual memory and/or I/O addresses. Each individual device is assigned to a set of specific addressed within the system's address space. I/O devices may be physically located either on the system board or on a Micro Channel Adapter Card. Several I/O devices may be grouped on a given Micro Channel Adapter card. FIG. 1 illustrates the System and Micro Channel I/O devices in relation to the rest of the Computer System.

When an Intel 80386 (Intel is a registered trademark of Intel Corporation) or other similar microprocessor 201 is the master processor on the MICRO CHANNEL bus 212, it may be programmed to run multiple virtual processor or multitasking sessions within the same physical processor. Operating the 80386 in this manner is called Virtual 8086 Mode or Protect Mode, respectively. When running in these modes, it is often desirable for each session to have its own individual set of I/O devices. For example, there may be two (or more) sessions running simultaneously, and it would be useful for each session to have its own separate keyboard and display to enable two (or more) individuals to operate the sessions at the same time. If only one set of addresses in the system is allocated for a keyboard, and only one for a display, then the problem becomes one of managing the multiple I/O devices that must share the same set of addresses.

One way that this problem has been addressed in the prior art is through the use of complex programming techniques. While this is effective under some circumstances, it is not a complete solution. Often, I/O devices require real-time servicing which is difficult, if not sometimes impossible, to provide using only the complex software methods now available.

A hardware-based solution that reduces some of this software overhead is described in an article entitled "Interrupt Service Allocation Technique For The MICRO CHANNEL Bus", IBM Technical Disclosure Bulletin, volume 33, number 1A, Jun. 1990, pp. 298-304, (which is hereby incorporated by reference). This article describes a technique which allows software to identify an interrupting device on a shared MICRO CHANNEL interrupt level without requiring polling every card that shares the level. Programmable Option Select (POS) is used to assign an iterrupt identification (ID) to each card sharing a given interrupt level. An interrupting card will pull the channel data bit low that corresponds to its assigned ID value in a Virtual Identification Register. Identifying the interrupting cad is then done by a single I/O read of the VIR, rather than polling each card individually.

While this technique overcomes some of the problems in the prior art, it is not a complete solution. If multiple adapters are set-up to respond to the same addresses, only one can be enabled at any given time. Significant processor overhead is required to manage the switching of multiple devices between ENABLED and DISABLED states when the adapters are sharing the same set of addresses. It is desirable to provide an efficient method to switch I/O devices between states.

In addition, there is no method in the prior art for a device in a DISABLED state to request service from the processor. This can cause data corruption or loss for multiple moderate to high-speed I/O devices. It is desirable to permit an adapter card to generate an Interrupt during a state in which it does not respond to addressing to avoid the data loss problem.

These problems can be avoided by assigning the devices to distinct addresses and allowing each of the devices to be fully enabled. However, having a standard I/O device respond to non-standard addresses will make the device incompatible with existing Commercial Off-The-Shelf Software. Examples of devices which have a large body of commercial support would be displays, keyboards, serial ports, and parallel ports. It is desirable to maintain compatibility with this software, even in a multitasking/multiuser environment.

OBJECTS OF THE INVENTION

It is the object of this invention to allow a plurality of I/O devices to share a common set of I/O addresses.

It is a further object of this invention to provide a new hardware state in which an I/O device adapter can generate interrupts when it is not capable of responding to addressing.

It is an additional object to provide a computer system in which multiple I/O devices can be attached to service multiple virtual processor sessions or multiple task threads in a multitasking operating system.

It is still another object of this invention to provide an efficient method for servicing interrupts presented by a plurality of devices sharing a set of addresses.

SUMMARY OF THE INVENTION

These objects and others as will become apparent, are achieved by placing most of the management of multiple session I/O accesses in hardware and introducing a new addressing state called the VIRTUAL or VIRTUAL ENABLED state. The new VIRTUAL ENABLED state is a hybrid of the current ACTIVE or ENABLED and INACTIVE or DISABLED states. In the ENABLED state, an I/O adapter responds to I/O addressing and presents interrupts to the processor. In the DISABLED state, the I/O adapter does not respond to I/O addressing and does not present interrupts. In the new VIRTUAL ENABLED state, the adapter does not respond to I/O addressing (as in the DISABLED state), but will still produce an interrupt (as in the ENABLED state).

With the VIRTUAL ENABLED state, multiple I/O adapters that would normally content for the same set of I/O addresses, or optionally be rendered inoperable, can always present interrupts and remain available. A single register, called the Virtual Identification Register (VIR), allows the processor to read the interrupt status for all adapters sharing the same set of I/O addresses, and a Virtual Control Register (VCR) allows the processor to cycle any of the devices quickly between the ENABLED and VIRTUAL ENABLED states to permit servicing of the interrupt.

BRIEF DESCRIPTION OF THE DRAWINGS

The foregoing and other advantages of the invention will be more fully understood with reference to the description of the preferred embodiment and with reference to the drawings wherein:

FIG. 4 is a diagram of the Virtual Identification Register.

FIG. 5 is a logical diagram of the Virtual control Register.

DESCRIPTION OF THE PREFERRED EMBODIMENT

While it will be readily understood by those skilled in the art that this invention cold be implemented in connection with many different I/O devices, such as displays, keyboards, mice, etc., for ease of discussion, the detailed description will be limited to serial adapters. Serial adapters can be used, for example, to connect modems, serial printers, etc. to the computer system. Furthermore only two serial adapters will be referenced, though the invention could easily accommodate multiple serial adapters.

Figure 1:
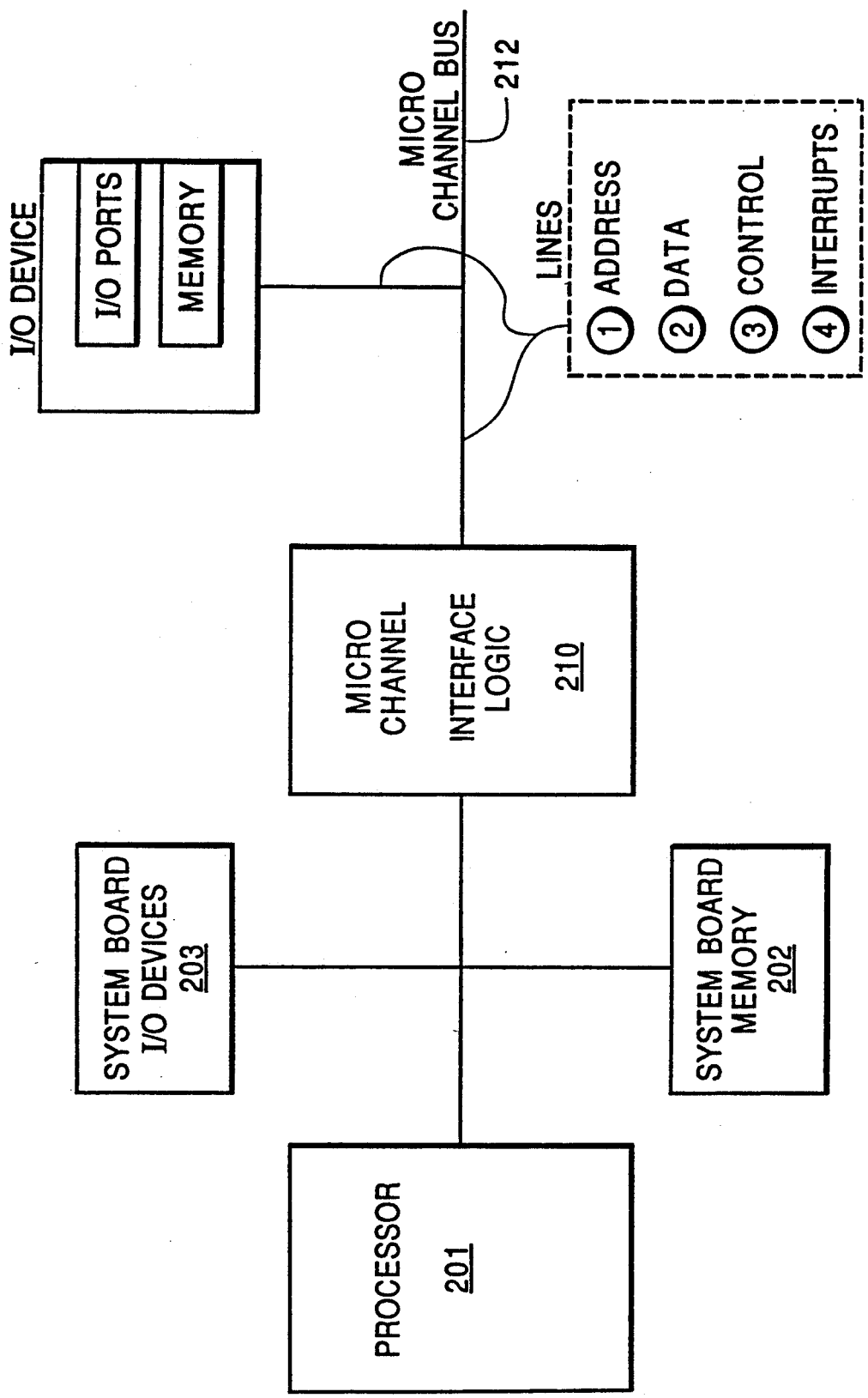
FIG. 1 is a block diagram showing the relationship of I/O adapters to the processor and MICRO CHANNEL bus.
Figure 2:
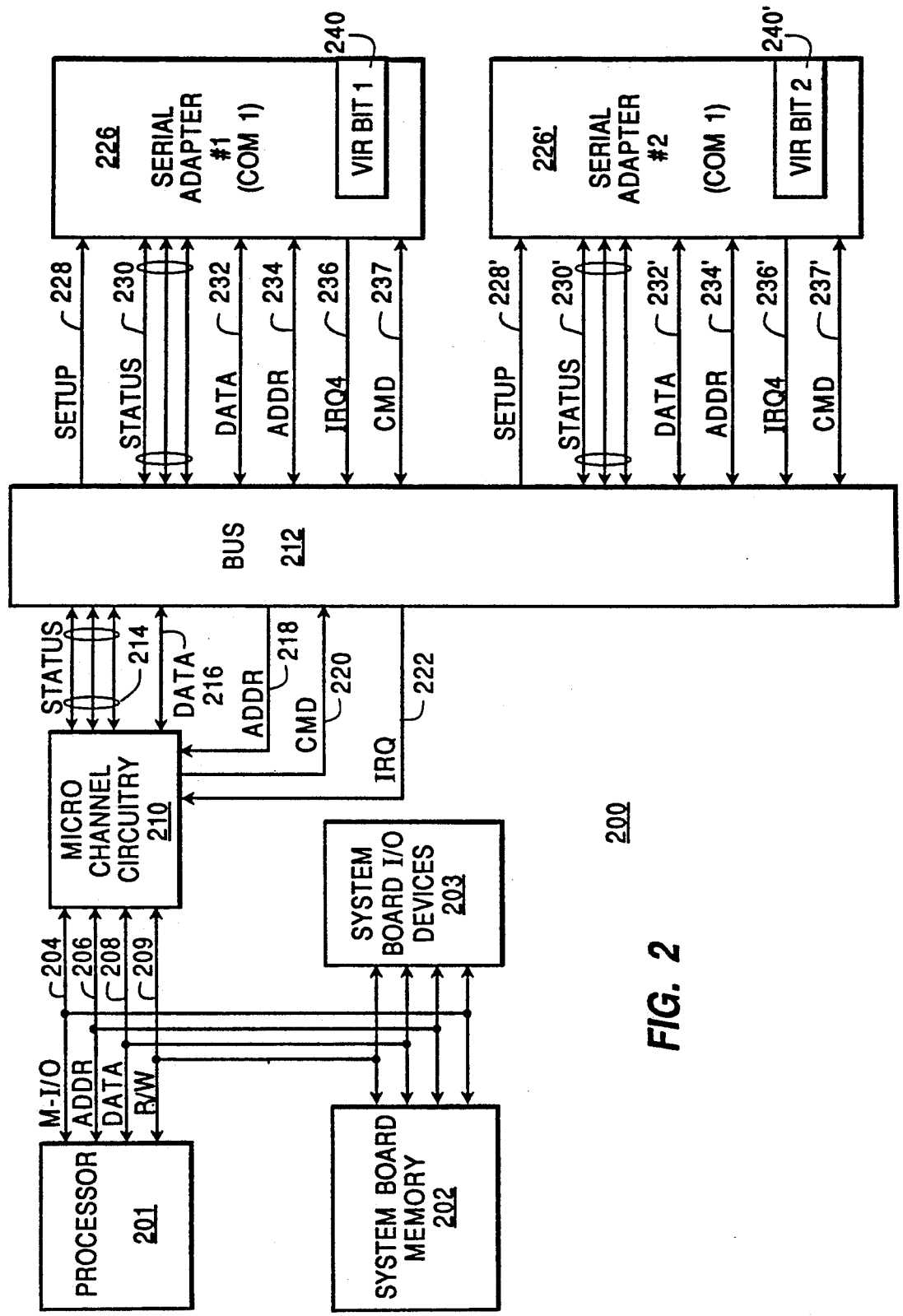
FIG. 2 is a detailed schematic of the system architecture.

The preferred embodiment of the System 200 in which this invention functions is shown in FIG. 2. Processor 201 is preferably an 80386 processor. Additional information on the Intel 80386 can be found in the "INTEL 80386 Programmer's Reference Manual" (Order Number: 230985-001 from INTEL Corp.) which is hereby incorporated by reference. Associated with processor 201 are system Board Memory 201 and System Board I/O Devices 203.

Communication among microprocessor 201, Memory 202, System Board I/O Devices 203 and MICRO CHANNEL Circuitry 210 is via the 80386 local bus which includes Memory Input/Output (M-I/O) line 204, Address (ADDR) line 206, DATA line 208, and READ/WRITE (R/W) line 209. The operation and detailed description of the circuitry contained with Block 210 is well-known by those skilled in the art and is beyond the scope of this invention. Further information can be found in the "INTEL 386 Hardware Reference Manual" (Order Number: 231732-003 from INTEL Corp.), which is hereby incorporated by reference.

M-I/O line 204 indicates whether a particular Address presented on line 206 refers to an address within Memory 202 or I/O Space 203. If the signal on M-I/O 204 is one state then I/O Space 203 is addressed; if the signal is the other state, then system Memory 202 is addressed.

MICRO CHANNEL bus 212 is the primary data "highway" for all data input/output within the System 200. Between circuitry Block 210 and bus 212 are several lines which transmit various types of information, as follows:

| Type | | Function |
| --- | --- | --- |
| Status lines (3) | 214 - | Controls Data Transfer |
| DATA line | 216 - | DATA |
| ADDR line | 218 | Address for Memory or I/O Space |
| CMD line | 220 | Indicates beginning and end of data transfer |
| IRQ line | 222 | Request for processor service |

Figure 3:
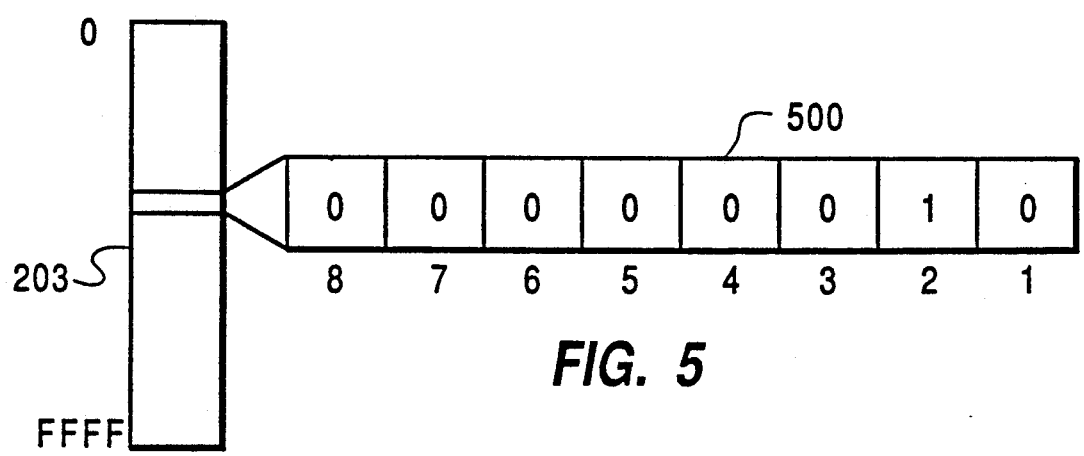
FIG. 3 is a logical map of the System Board I/O Space.

As stated above, in this example there are two serial adapters, 226 and 226', which share the I/O addresses 3F8-3FF assigned to the serial port COM1. An expanded view of the I/O space assigned to COM1 can be found in FIG. 3.

Referring back to FIG. 2, serial adapters 226 and 226' are identical adapters, with each having the same interconnection lines between it and the bus 212. Since they are identical, the lines for serial adapter 226 only will be described, but it is understood that serial adapter 226' has corresponding lines with the prime designation. The lines between serial adapter 226 and bus 212 are as follows:

| Type | | Function |
| --- | --- | --- |
| SETUP line | 228 | Allows card to be setup prior to operational usage |
| STATUS line | 230 | Controls operation of Bus Cycle |
| DATA line | 232 | DATA |
| ADDR line | 234 | Address for Memory or I/O Space |
| IRQ4 line | 236 | Interrupt service request |
| CMD line | 237 | Indicates beginning and end of data transfer |

Since serial adapter #1 (226) and serial adapter #2 (226') must share the I/O address spaces assigned to COM 1, only one of these adapters can be ENABLED at a time, otherwise data would be lost and/or destroyed. The Technical Disclosure Bulletin article referenced in the BACKGROUND Section introduces the concept of a logical Virtual Identification Register (VIR) in which each adapter card is assigned a bit for presenting an interrupt(s). In this example, serial adapter 226 could own VIR bit 1 (240) and serial adapter 226' could own VIR bit 2 (240'). Logically assembling the VIR bits results in the VIR 400 shown in FIG. 4 in which adapter 226' is presenting an interrupt in bit #2. Bits 3-8 are not used in this example since there are only 2 serial adapters.

Referring now to FIG. 5, an additional register called the Virtual Control Register (VCR) 500 is shown. There is one VCR associated with each type of adapter. So, in this example, VCR 500 is the VCR for all serial adapters sharing the COM 1 port. Bit #1 is assigned to serial adapter #1 (226), and Bit #2 is assigned to Serial Adapter #2 (226'). If there were an additional six Serial Adapters sharing COM 1, they would be assigned bits 3-8.

As stated above, VCR 500 contains the status information for all of the Serial Adapters sharing the COM1 address space. A status of "0" means that the adapter is VIRTUALLY ENABLED. In this state, the adapter does not respond to addressing, but can present interrupts. A status of "1 means that the adapter is ACTIVE or ENABLED, i.e. it does respond to addressing and can present interrupts.

Figure 6:
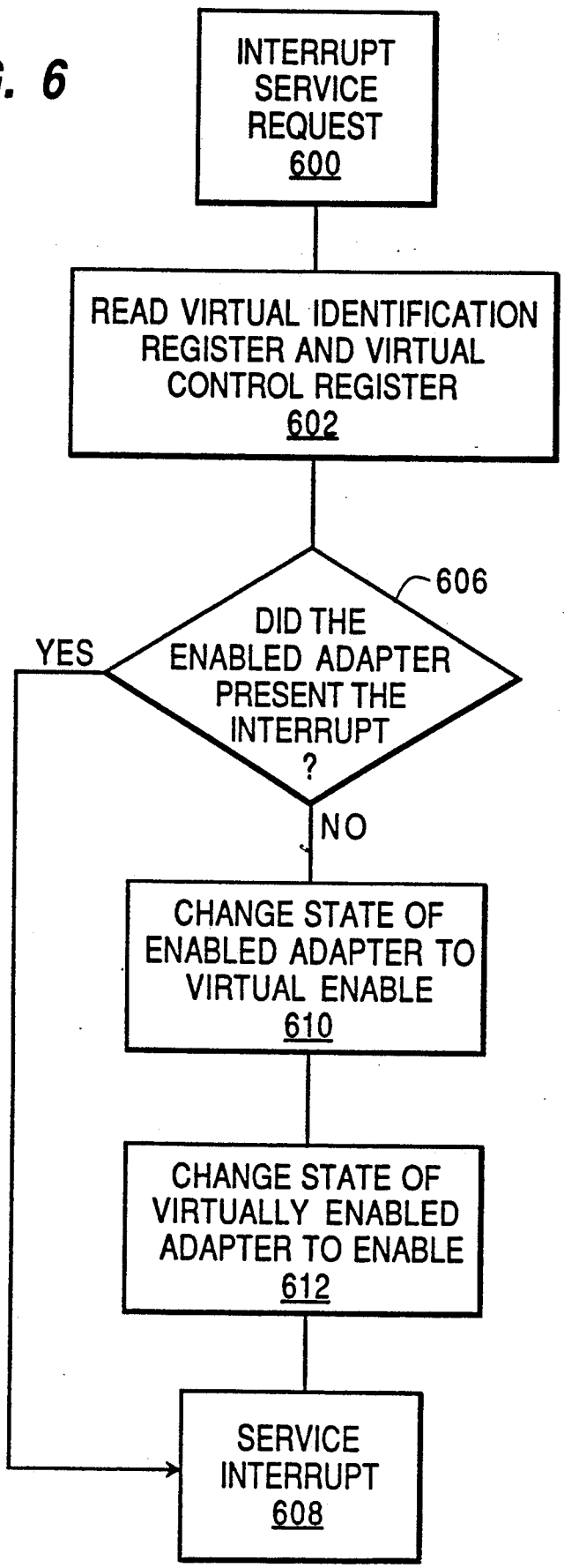
FIG. 6 is a flow diagram showing the interrupt servicing method.

With reference to FIG. 6, the management of I/O via the serial adapters will now be described. After an Interrupt Request is received (Block 600) the processor will read the VIR and VCR to determine which adapters are presenting interrupts and their states (Block 602).

The system will check the VCR to determine the status of that particular adapter to see if the interrupting adapter is the ENABLED adapter (Block 606). If so, the interrupt will be serviced in accordance with normal procedures (Block 608). If not, it will be necessary to change the state of the interrupting adapter from VIRTUAL ENABLED to ENABLED, to permit servicing the interrupt. Since, however, only ne adapter can be ENABLED at a time, it will first be necessary to put the ENABLED adapter into the VIRTUAL ENABLED state.

In Block 610, the state of the ENABLED adapter is changed to VIRTUAL ENABLED by clearing (set to "0") its VCR bit. In Block 612, the state of the VIRTUALLY ENABLED adapter is changed to ENABLED by setting its VCR bit to "1". Now the interrupt can be serviced (Block 608).

While the invention has been described with reference to a preferred embodiment, it will be understood by those skilled in the art that modifications may be made without departing from the spirit and the scope of the present invention. The embodiments presented above are for purposes of example and are not to be taken to limit the scope of the appended claims.

We claim:

1. A computer system comprising:
   a central processor for executing instructions;
   a first bus coupled to a central processor;
   a system memory coupled to the first bus;
   a plurality of input/output adapters, each of said adapters having an active/inactive status and an interrupt status;
   said interrupt status indicating whether or not said adapter is presenting an interrupt;
   a second bus coupled to said first bus and said plurality of input/adapters, said second bus enabling said first bus and said input/output adapters to exchange data;
   means for interfacing between said first bus and said second bus;
   a system input/output address space coupled to the first bus, said address space associated with said plurality of said input/output adapters;
   each of said input/output adapters including a unique Virtual Identification Register (VIR) bit identifying said interrupt status of said including adapter;
   each of said input/output adapters having a unique associated VCR bit, said VCR bit being line a one-to-one relationship with said adapter, said VCR bit indicating said active/inactive status of said input/output adapter associated with said VCR bit; and
   interrupt handling means which performs the following functions:
   identifies which one of said plurality of input/output adapters is presenting an interrupt by means of said status shown by said VIR bit associated with said interrupting adapter;
   identifies said VCR bit associated with said interrupting adapter;
   changes said identified VCR bit to reflect an active status, if said identified VCR bit is indicating said interrupting adapter as inactive, and services said interrupt;
   said interrupt handling means being included within said central processor;
   whereby said plurality of input/output adapters sharing said input/output address space can present interrupts to said central processor while in an inactive status.

2. The system as claimed in claim 1 having a logical VIR register, said VIR register comprised of all of said VIR bits.

3. The system as claimed in claim 1 wherein said plurality of VCR bits collectively comprise a Virtual Control Register (VCR), said VCR included within said system input/output address space.

4. In a computer processing environment, a system comprising:
   a central processor, providing a plurality of virtual sessions;
   a local bus coupled to said central processor;
   a system memory coupled to said local bus;
   a system input/output address space coupled to said local bus;
   a plurality of input/output adapters, each of said adapters having an active/inactive status and an interrupt status, said interrupt status indicating if said adapter is presenting an interrupt;
   a high speed data bus for exchanging data between said local bus and said plurality of input/output adapters;
   means for interfacing between said local bus and said high speed bus;
   said plurality of input/output adapters sharing said input/output address space and communicating with said high speed bus;
   a plurality of input/output devices coupled to said plurality of input/output adapters, each of said plurality of virtual sessions requiring at least one of said plurality of input/output devices;
   each of said plurality of input/output adapters having a unique associated VCR bit, said VCR bit being line a one-to-one relationship with said adapter, said VCR bit indicating said active/inactive status of said input/output adapter associated with said VCR bit; and
   interrupt handling means which performs the following functions;
   identifies which one of said plurality of input/output adapters is presenting an interrupt by means of said status shown by said VIR bit associated with said interrupting adapter;
   identifies said VCR bit associated with said interrupting adapter;
   changes said identified VCR bit to reflect an active status, if said identified VCR bit is indicating said interrupting adapter as inactive, and services said interrupt,
   said interrupt handling means being included within said central processor;
   whereby said plurality of input/output adapters sharing said input/output address space can present interrupts to said central processor while in an inactive status and have said active/inactive statuses of said input/output devices changed so that said interrupts can be serviced.

5. A system as claimed in claim 4 wherein said VIR bits collectively comprise a logical VIR register.

6. The system as claimed in claim 4 wherein said plurality of VCR bits collectively comprise a Virtual Control Register (VCR), said VCR included within said system input/output address space.

* * * * *